United States Patent [19]

Tokuda

[11] Patent Number: 5,815,244
[45] Date of Patent: Sep. 29, 1998

[54] APPARATUS FOR RECORDING INFORMATION ON PRINTING OF PHOTOGRAPHS

[75] Inventor: Kanji Tokuda, Kanagawa, Japan

[73] Assignee: Fuji Photo Film Co., Ltd., Kanagawa, Japan

[21] Appl. No.: 904,459

[22] Filed: Aug. 1, 1997

Related U.S. Application Data

[63] Continuation of Ser. No. 530,437, Sep. 19, 1995, abandoned, which is a continuation of Ser. No. 298,332, Aug. 30, 1994, abandoned.

[30] Foreign Application Priority Data

Aug. 31, 1993 [JP] Japan ................................. 5-215819

[51] Int. Cl.$^6$ ........................................................ C03B 27/52
[52] U.S. Cl. .................................................. 355/41; 355/35
[58] Field of Search ........................ 355/35, 38, 40, 355/41, 67, 71, 77; 371/69.1, 72; 235/432; 364/DIG. 2

[56] References Cited

U.S. PATENT DOCUMENTS

| | | | |
|---|---|---|---|
| 4,606,069 | 8/1986 | Johnsen | 382/56 |
| 4,672,679 | 6/1987 | Freeman | 382/40 |
| 4,782,390 | 11/1988 | Hayashi et al. | 358/76 |
| 4,811,042 | 3/1989 | Cloutier et al. | 354/106 |
| 4,860,059 | 8/1989 | Terashita | 355/38 |
| 4,980,760 | 12/1990 | Hiratsuka et al. | 358/80 |
| 5,023,655 | 6/1991 | Hicks | 355/39 |
| 5,041,866 | 8/1991 | Imoto | 355/38 |
| 5,264,683 | 11/1993 | Yoshikawa | 354/105 |
| 5,274,422 | 12/1993 | Yoshikawa | 355/77 |
| 5,337,130 | 8/1994 | Satoh | 355/77 |

FOREIGN PATENT DOCUMENTS

| | | | |
|---|---|---|---|
| 3126947 | 5/1991 | Japan | G03D 15/00 |
| 3126948 | 5/1991 | Japan | G03D 15/00 |

*Primary Examiner*—Daniel P. Malley
*Attorney, Agent, or Firm*—Sughrue, Mion, Zinn, Macpeak & Seas, PLLC

[57] ABSTRACT

An information recording apparatus has an LUT storing a table, which represents a relationship between a key code and 2401 combinations of density correcting data and color correcting data. The combinations are arranged in the table in an order of frequency of occurrences thereof. Each combination constitutes exposure correcting information in combination. With a photo film exposed, a photoprint is produced in initial photographic printing from an imaging frame on the photo film. A key code is read from LUT, with an address of the exposure correcting information used in the printing. An imprinting head imprints the key code to the photoprint or containing sheath. With the key code imprinted, the exposure correcting information is usable in further photographic printing.

34 Claims, 8 Drawing Sheets

| KEY CODES | CORRECTING DATA | | | |
|---|---|---|---|---|
| | D | C | M | Y |
| 0 | N | N | N | N |
| 1 | 1 | N | N | N |
| 2 | 2 | N | N | N |
| 3 | A | N | N | N |
| 4 | 3 | N | N | N |
| 5 | B | N | N | N |
| 6 | N | N | 2 | N |
| 7 | A | N | 2 | N |
| 8 | 4 | N | N | N |
| 9 | 1 | 2 | N | 2 |
| 10 | A | 2 | N | 2 |
| 11 | N | 1 | N | 2 |
| 12 | N | 2 | N | 2 |
| 13 | A | 1 | N | 2 |
| ⋮ | ⋮ | ⋮ | ⋮ | ⋮ |
| 42 | 2 | 1 | N | 1 |
| 43 | 4 | 2 | N | 2 |
| 44 | 2 | N | N | 2 |
| ⋮ | ⋮ | ⋮ | ⋮ | ⋮ |
| 891 | 3 | D | 2 | B |
| 892 | 4 | 2 | D | 2 |
| 893 | C | C | 4 | 3 |
| 894 | D | 1 | 4 | 4 |
| ⋮ | ⋮ | ⋮ | ⋮ | ⋮ |

| FRAME NOS. | NOS. OF EXTRA PRINTS | KEY CODES (EXPOSURE CORRECTING DATA) |
|---|---|---|
| < 1 > | | 0  (N N N N) |
| < 2 > | | 0  (N N N N) |
| < 3 > | | 6  (N N 2 N) |
| < 4 > | | 0  (N N N N) |
| < 5 > | | 8  (4 N N N) |
| < 6 > | | 0  (N N N N) |
| < 7 > | | 0  (N N N N) |
| ⋮ | ⋮ | ⋮ |
| <24> | | 2  (2 N N N) |
| < E > | | 0  (N N N N) |

EXTRA PRINTING ORDER SHEET

APPARATUS FOR RECORDING INFORMATION ON PRINTING OF PHOTOGRAPHS

This is a Continuation of application Ser. No. 08/530,437 filed Sep. 19, 1995 and application Ser. No. 08/298,332 filed Aug. 30, 1994, now abandoned.

BACKGROUND OF THE INVENTION

1. Field of the Invention

The present invention relates to an apparatus for recording information on printing of photographs. More particularly, the present invention relates to a recording apparatus of photographic printing information, obtained in the initial printing, for making it easy to condition the reprinting or extra printing.

2. Description Related to the Prior Art

A user of a camera, having taken photographs on a negative photo filmstrip (hereinafter referred to as negative film), deposits his film to a photo laboratory or photofinisher, who is requested not only to develop the film but to produce photoprints from the film. In the photo laboratory, the negative film is removed from a film cassette, and developed by processing it in a film processor. The developed negative film is then set into a photographic printer. A plurality of imaging frames photographed on the negative film are subjected to printing, where photographic paper is exposed to create images from the imaging frames. The exposed paper is developed by being processed in a paper processor, and then cut down frame by frame to obtain photoprints. On the other hand, the negative film as a strip is cut apart into plural film pieces each having six imaging frames. Each film piece is inserted and contained in a film containing sheath. The film pieces with the containing sheaths are associated with the photoprints. They are packaged in a photo-lab wrapper, and supplied to the user or customer.

In the initial printing, a single photoprint is produced for imaging frame on the negative film. If the customer desires to have plural photoprints for one imaging frame, he orders the photo laboratory to produce extra prints.

In photographic printing, an imaging frame is subjected to photometry to obtain the average transmittance density of the imaging frame. On the basis of the average transmittance density, fundamental exposure amounts of the three colors are calculated. Nearly 70% of imaging frames generally treated in photo laboratories can be finished simply according to the fundamental exposure amounts in the form of photoprints having density and color balance of high fidelity. However, it has been found that 30% of the imaging frames cause "subject failure" as referred to in the photographic field, and fails to result in unacceptable photoprints when finished simply according to the fundamental exposure amounts. For such imaging frames which might cause "subject failure", an operator observes the negative images, determines exposure correcting amounts for the Density, Yellow, Cyan and Magenta on the basis of his skill and experience, and operates a keyboard to correct the fundamental exposure amounts.

The customer generally places an order for producing extra prints from the negative film with a photo laboratory, which is possibly the same as that he ordered for the initial printing. However, even the same photo laboratory has plural operators and is likely to deposit the extra printing order to an operator different from one to whom the initial printing was deposited. As exposure correcting amounts for the extra printing are redetermined, they may be not exactly correspond to the counterpart used in the initial printing. Therefore such extra prints have has a finished condition different from that of photoprints of the initial printing. There are commonly assigned co-pending patent applications JP-A (Japanese Patent Laid-open Publication Nos.) 3-126947 and 3-126948, which disclose constructions in which the rear of a photoprint is provided with an imprint of a frame number and the exposure correcting data. In the extra printing operation, the exposure correcting data are read from the photoprint and inputted.

It is however necessary to input exposure correcting data before the printing, in utilizing the exposure correcting data obtained from the initial printing and imprinted on the containing sheath or behind the photoprint. Normally, the exposure correcting data is inputted by operating a density correcting key (D), a cyan correcting key (C), a magenta correcting key (M) and a yellow correcting key (Y). Steps to be inputted are 7 values of −3 to −1, N, and +1 to +3, or more finely 11 values of −5 to −1, N, and +1 to +5. Imprints of the correcting data are "A" as value "−1", "B" as value "−2", and "C" as value "−3", for the purpose of reducing the number of the signs to be imprinted. It is general to use an imprint of "N" as value "0", because the value zero is regarded as "Normal" without correction. Let "+3" be inputted immediately after the density correcting key D. "0" be set for the density correcting key C. "−1" be inputted after the density correcting key M, and "−2" be inputted after the density correcting key Y. Then the correcting data are imprinted as "3 N A B".

In the extra printing, the operator is required to memorize the data "3 N A B" obtained from the initial printing. The operator depresses the density correcting key D and the step key "3", leaves the cyan correcting key C untouched, then depresses the magenta correcting key M, the step key "A", the density correcting key Y, and the step key "B". It is necessary for the operator to memorize the four values and their order, to operate the keys in the order of "3 - M - A - Y - B" without fail. This is a problem in difficulty in inputting operation. If there is an error in the inputs, it results in an unacceptable photoprint, and requires a reprinting operation. Hence the difficulty in inputting lowers the efficiency in printing. The same problem occurs in a reprinting operation which takes place in the initial printing immediately after the film development. When the operator is not skilled but poor at the estimation for inputting correction, an initially obtained photoprint is unacceptable and requires an operation of reprinting. However there remains the difficulty in inputting the correcting data, and this results in low efficiency in reprinting.

SUMMARY OF THE INVENTION

In view of the foregoing problems, an object of the present invention is to provide a printing information recording apparatus enabling a photofinishing operator easily to enter printing information obtained in the initial printing into a photographic printer.

Another object of the present invention is to provide a printing information recording apparatus enabling an operator to finish extra prints in a condition corresponding to photoprints were obtained from the initial printing.

In order to achieve the above and other objects and advantages of this invention, an apparatus records printing data to a recording medium. A table memory stores a table representing a relationship between a key code and plural combinations of density correcting data and color correcting data. The combinations are arranged in the table in consideration of an order of frequency of occurrences thereof. The density correcting data and the color correcting data constitute exposure correcting information in combination. An imprinting device imprints to the recording medium a key code, read from the table memory as printing data, with an address of the exposure correcting information used in initial photographic printing where a photoprint is produced from an imaging frame photographed on photo film. The key code is adapted to determining the exposure correcting information usable in further photographic printing.

A photofinishing operator is enabled easily to enter printing information obtained in the initial printing into a photographic printer. The operator is enabled to finish extra prints in a condition equal to that in which photoprints were obtained from the initial printing.

An inputting device is adapted to manually inputting the key code read visually from the photoprint for the further printing. A second table memory previously stores a second table representing the relationship of the first table memory and between the key code and the plural combinations of the density correcting data and the color correcting data. One of the combinations is read from the second table memory by the key code being an address of the second table memory, to correct a fundamental exposure amount in the further printing.

A display device displays the one combination read from the second table memory. The displayed exposure correcting information is referred to in combination with observation of a condition of previously finishing the photoprint, and adapted to manually inputting new density correcting data and/or color correcting data through the inputting device.

The photo film has number information recorded thereon in association with the imaging frame. A number reader reads the number information of the imaging frame from the photo film. The imprinting device further imprints the number information to the recording medium in a position of the imaging frame.

The recording medium comprises an order sheet in use for extra printing from the imaging frame. A number of extra prints to be produced from the imaging frame is recordable on the order sheet in association with the number information.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
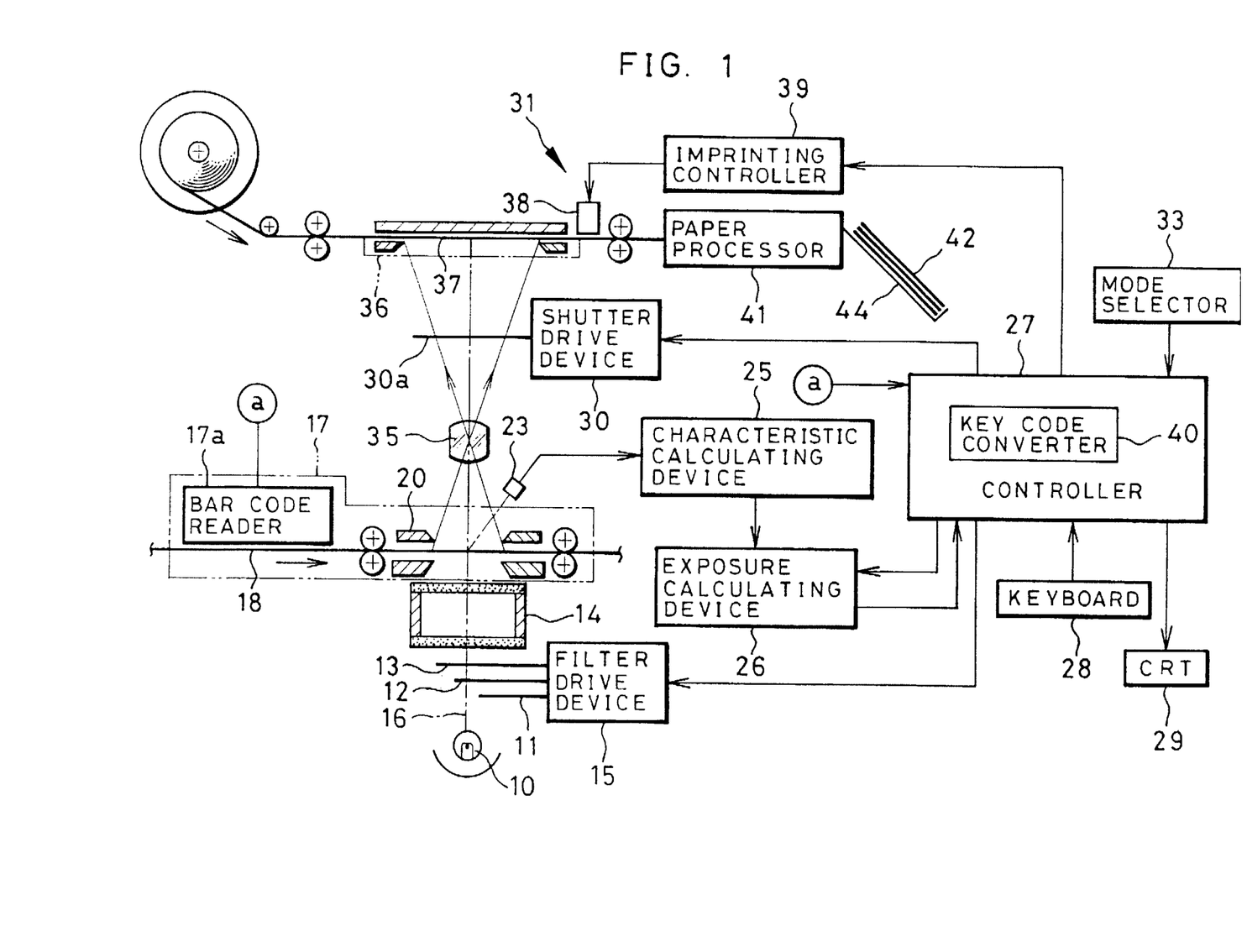
FIG. 1 is a schematic diagram illustrating a printer/processor incorporating a printing information recording apparatus of the present invention.

FIG. 1 illustrates a printer/processor for a small photo laboratory in accordance with the present invention. White light is emanated from a light source 10, passed through cyan, magenta and yellow filters 11 to 13 and applied to a mixing box 14. The color correcting filter s 11 to 13 are adjusted by a filter drive device 15 regarding an amount of insertion into a light path 16, to adjust intensity of the printing light and three-color component intensity of printing light. The mixing box 14 consists of a box-like tube of which mirror surfaces are disposed on the inside and of which diffusing plates are disposed on the top and bottom ends.

A film carrier 17 i s disposed in a printing station, where developed negative film 18 is set. Light passed through the mixing box 14 is applied to the negative film 18. To keep the negative film 18 flat, a film mask 20 is disposed on the printing station. The film mask 20 has an opening having a size of an imaging frame on the negative film 18. When the negative film 18 is moved, the film mask 20 is raised away from the printing station by a solenoid (not shown), and is pressed on the negative film 18 on the printing station.

A scanner 23 is disposed above and beside a printing station, consists of a lens and a image area sensor, and measures light passed through each of the points in a frame set in the printing station. A signal from the scanner 23 is sent to a characteristic calculating device 25, where various characteristic values are calculated and sent into an exposure calculating device 26.

The exposure calculating device 26 calculates fundamental exposure amounts for each of the three colors from measured various characteristics and in accordance with equations well known in the art, and operates as a first calculating section 26a. Before printing of each imaging frame, the operator visually inspects the negative image on the film 18. If one imaging frame is beyond a range in which the scanner 23 corrects the exposure, he inputs the exposure correcting data through a keyboard 28. The inputted correcting data are sent via a controller 27 to the exposure calculating device 26, and added to the fundamental exposure amounts, to obtain the exposure amounts for the respective colors, in which the exposure calculating device operates here as a second calculating section 26b. The exposure amount for each color is entered into the controller 27.

The controller 27 consists of a microcomputer which is well known in the art, and has the keyboard 28 for setting various commands and exposure correcting data, and a CRT 29 for displaying the data visually. The controller 27 receives data of the three-color printing exposure amount calculated by the exposure calculating device 26, responsively controls the filter drive device 15, and adjusts the set position of the correcting filters 11 to 13. The controller 27, in addition, controls the a shutter drive device 30 and a rear imprinting device 31.

The controller 27 is provided with a mode selector 33, which is adapted to changing over between a normal printing mode and a reprinting mode. According to either of those modes, exposure correcting equations stored in the exposure calculating device 26 are selected. When the normal printing mode is present, exposure amounts are dependent upon the fundamental exposure amounts on the basis of LATD (large-area transmittance density) and the exposure correcting amounts are entered through the keyboard as a first inputting device 28. When the reprinting mode is present, exposure amounts are dependent upon the fundamental exposure amounts on the basis of LATD, the exposure correcting amounts are entered through the keyboard 28 as a second inputting device in the key-code form obtained during the initial printing, and relative data is inputted manually for further correction according to observation of an unacceptable photoprint as a result of the initial printing. The keyboard 28 has correcting keys arranged in a 4×7 matrix. The four arrays are respectively for Density correction, Cyan correction, Magenta correction and Yellow correction. Each array consists of 7 step keys of −3 (C), −2 (B), −1 (A), N, +1, +2, and +3. In spite of this construction, a keyboard of the printer can have alternative arrangement of keys for correction: Cyan, Magenta and Yellow color correcting keys are disposed to be depressed for commanding adjustment of each color density for printing the imaging frame; and numerical step keys to be depressed for entering values −3 (C), −2 (B), −1 (A), +1, +2, and +3, wherein if any of the color correcting keys has been depressed prior to the step keys, then the color density associated with the color correcting key is increased/decreased stepwise by an amount preset according to the relative greatness of the entered value, and if none of the color correcting keys has been depressed prior to the step keys, then the density is increased/decreased stepwise by the preset amount. This keyboard is preferable because the number of keys is as small as 9.

Above the printing station is disposed a printing lens 35, which enlarges an imaging frame to be projected to color photographic paper 37 disposed behind a paper mask 36. Between the printing lens 35 and the color paper 37, a shutter 30a is disposed and controlled by the shutter drive device 30.

Downstream of the paper mask 36 is disposed an imprinting head 38 for imprinting the key code on the rear of the color paper 37. The imprinting head 38 is controlled by an imprinting controller 39 or a head drive circuit, and imprints the key code after conversion based on the exposure correcting data by a key code converter 40.

Figure 1A:
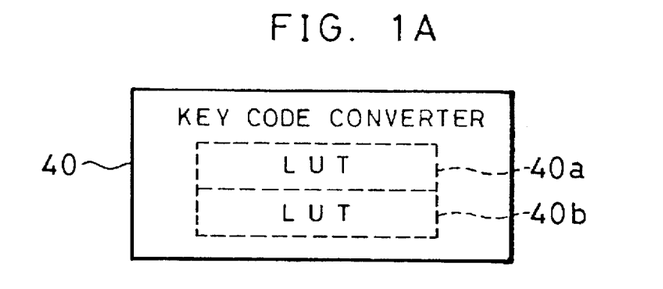
FIG. 1A is a schematic diagram illustrating a structure of a key code converter.

The key code converter 40 receives density correcting data, and cyan, magenta and yellow correcting data, and generates a signal of a key code representing a combination of the four bodies of correcting data. The key code converter 40 also receives a key code signal, and generates a signal of a combination of density correcting data, and cyan, magenta and yellow correcting data, associated with the key code. The key code converter 40 includes two look-up table memories (LUT) 40a and 40b in FIG. 1A, the second of which will be described later. As illustrated in Table 1, key codes are assigned to respective combinations of correcting data, and written in the look-up table memory 40a as data at the addresses represented by the associated combination of correcting information.

The key code is a numerical value, and depends on a combination of values inputted at the density correcting keys (D), the cyan correcting keys (C), the magenta correcting keys (M) and the yellow correcting keys (Y). All the combinations of the four inputted values are assigned serial numbers, of which lower numbers are assigned to combinations having a higher grade of frequency. Table 1 illustrates a relationship between key codes and correcting data, in the case where four correcting keys are disposed for Density, Cyan, Magenta and Yellow, and steps to be inputted are 7 values of −3 to −1, N, and +1 to +3.

TABLE 1

| Key Codes | Inputs through keyboard (addresses) | | | |
|---|---|---|---|---|
| (data) | Density | Cyan | Magenta | Yellow |
| 0 | N | N | N | N |
| 1 | 1 | N | N | N |
| 2 | A | N | N | N |
| 3 | 2 | N | N | N |
| 4 | B | N | N | N |
| 5 | 3 | N | N | N |
| 6 | C | N | N | N |
| 7 | N | 1 | N | N |
| 8 | 1 | 1 | N | N |
| : | : | : | : | : |
| 14 | 1 | A | N | N |
| 15 | A | A | N | N |
| : | : | : | : | : |
| 48 | C | C | N | N |
| 49 | N | N | 1 | N |
| 50 | 1 | N | 1 | N |
| : | : | : | : | : |
| 635 | C | C | N | 3 |
| 636 | C | C | N | C |
| 637 | N | N | 1 | 1 |
| : | : | : | : | : |
| 2399 | C | C | C | 3 |
| 2400 | C | C | C | C |

Tables 2A and 2B illustrate total of combinations, cumulation of combinations, and associated key codes in the case where four amounts for Density, Cyan, Magenta and Yellow are to be corrected, and steps to be inputted are 7 values of +1 to +3.

TABLE 2A

| | | Inputs through keyboard | | | |
|---|---|---|---|---|---|
| | | Density | Cyan | Magenta | Yellow |
| Fre-quency of occur-rence (from High to Low) | 1 | N & ±1 to ±3 7 values | N 1 value | N 1 value | N 1 value |
| | 2 | N & ±1 to ±3 7 values | ±1 to ±3 6 values | N 1 value | N 1 value |
| | 3 | N & ±1 to ±3 7 values | N 1 value | ±1 to ±3 6 values | N 1 value |
| | 4 | N & ±1 to ±3 7 values | N 1 value | N 1 value | ±1 to ±3 6 values |
| | 5 | N & ±1 to ±3 7 values | ±1 to ±3 6 values | ±1 to ±3 6 values | N 1 value |
| | 6 | N & ±1 to ±3 7 values | ±1 to ±3 6 values | N 1 value | ±1 to ±3 6 values |
| | 7 | N & ±1 to ±3 7 values | N 1 value | ±1 to ±3 6 values | ±1 to ±3 6 values |
| | 8 | N & ±1 to ±3 7 values | ±1 to ±3 6 values | ±1 to ±3 6 values | ±1 to ±3 6 values |

TABLE 2B

|  | | Total of Combinations | Cumulation | Key codes |
|---|---|---|---|---|
| Fre- | 1 | 7 | 7 | 0–6 |
| quency | 2 | 42 | 49 | 7–48 |
| of | 3 | 42 | 91 | 49–90 |
| occur- | 4 | 42 | 133 | 91–132 |
| rence | 5 | 252 | 385 | 133–384 |
| (from | 6 | 252 | 637 | 385–636 |
| High | 7 | 252 | 889 | 637–888 |
| to | 8 | 1512 | 2401 | 889–2400 |
| Low) | | | | |

There are $7^4=2401$ combinations possible, because the four amounts are to be corrected and the 7 steps of $-3$ to $-1$, N, and $+1$ to $+3$ are possible for each amount. Those combinations are roughly graded in Classes 1 to 8 according to the frequency of occurrences, in light of use of the key for N or not for N.

Class 1: highest frequency, as only D key is depressed, or no key is ever depressed.

Class 2: second highest frequency, as a C key at a step different from N is depressed.

Class 3: second highest frequency, as an M key at a step different from N is depressed.

Class 4: second highest frequency, as a Y key at a step different from N is depressed.

Class 5: third highest frequency, as a C key at a step different from N is depressed, and an M key at a step different from N is depressed.

Class 6: third highest frequency, as a C key at a step different from N is depressed, and a Y key at a step different from N is depressed.

Class 7: third highest frequency, as an M key at a step different from N is depressed, and a Y key at a step different from N is depressed.

Class 8: lowest frequency, as a C key at a step different from N is depressed, an M key at a step different from N is depressed, and a Y key at a step different from N is depressed.

In each group, the frequency is the higher if a combination includes an element rather close to N (zero).

In consequence, the key code converter 40 develops a key code in response to receipt of each combination of correcting data. Table 3 illustrates the relationship for a conversion from the correcting data to the key code and also a conversion from the key code to the correcting data. Table 3 includes not only the decimal key codes but hexadecimal key codes, which may be used in place of the decimal key codes.

Note that the key code converter 40 of the preferred embodiment has the look-up table memory 40a. Alternatively a key code converter may store converting equations for calculating a key code from a combination of correcting data.

TABLE 3

| Inputs thru keyboard | | | | Correcting data | | | | Key codes | Key codes |
|---|---|---|---|---|---|---|---|---|---|
| D | C | M | Y | D | C | M | Y | (decimal) | (hexadecimal) |
| 3 | N | 2 | N | 3 | 0 | 2 | 0 | 68 | 44 |

TABLE 3-continued

| Inputs thru keyboard | | | | Correcting data | | | | Key codes | Key codes |
|---|---|---|---|---|---|---|---|---|---|
| D | C | M | Y | D | C | M | Y | (decimal) | (hexadecimal) |
| 2 | 3 | 2 | C | 2 | 3 | 2 | −3 | 2019 | 7E3 |
| C | 3 | A | C | −3 | 3 | −1 | −3 | 1980 | 7BC |
| C | 2 | N | 3 | −3 | 2 | 0 | 3 | 503 | 1F7 |
| A | C | A | 3 | −1 | −3 | −1 | 3 | 2221 | 8AD |
| C | 1 | N | C | −3 | 1 | 0 | −3 | 426 | 1AA |
| B | 2 | 2 | N | −2 | 2 | 2 | 0 | 235 | EB |
| A | 2 | N | 2 | −1 | 2 | 0 | 2 | 485 | 1E5 |
| 2 | N | 2 | 1 | 2 | 0 | 2 | 1 | 724 | 2D4 |
| N | 2 | A | N | 0 | 2 | −1 | 0 | 224 | E0 |
| 3 | N | A | 1 | 3 | 0 | −1 | 1 | 684 | 2AC |
| 2 | 2 | 3 | 3 | 2 | 2 | 3 | 3 | 1592 | 638 |
| N | A | 1 | N | 0 | −1 | 1 | 0 | 175 | AF |
| C | N | 2 | N | −3 | 0 | 2 | 0 | 69 | 45 |
| A | 2 | N | C | −1 | 2 | 0 | −3 | 506 | 1FA |
| C | N | 1 | A | −3 | 0 | 1 | −1 | 650 | 28A |

Figure 2:
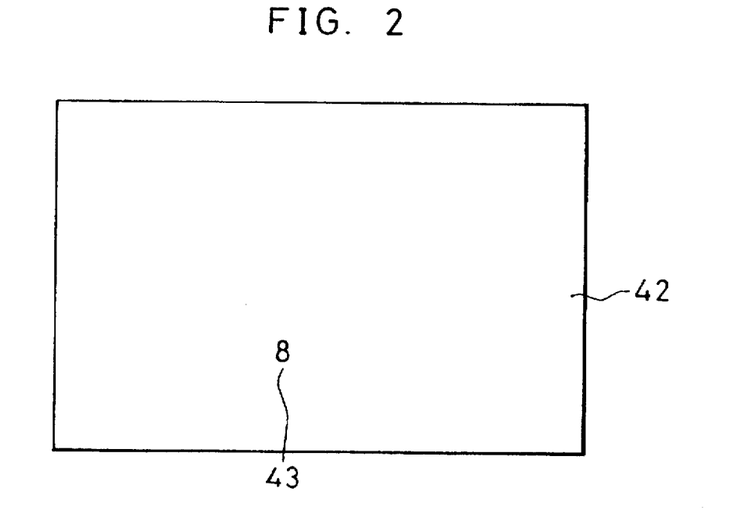
FIG. 2 is a rear view illustrating a photoprint with a key code imprinted.

The imprinting controller 39 causes the head 38 to imprint the key code on a back surface of the color paper 37 according to the result of the conversion in the key code converter 40. The color paper 37 after the printing is sent into a paper processor 41, where the color paper 37 is developed, dried, and cut off print from print by a paper cutting blade, to exit a photoprint 42 into a receptacle tray 44. FIG. 2 illustrates the photoprint 42 with a key code 43 of "8" imprinted thereon. The key code of "8" represents the combination of the exposure correcting data (1, 1, N, N) inputted through the correcting keys in the order of D, C, M, Y.

In the reprinting, process which is shown in FIG. 10 the imaging frame is set on an exposure station in the film carrier 17. A key code "8" is visually read from the rear of the photoprint, and inputted through the keyboard 28 (step 220). A signal of the inputted key code is converted by the key code converter 40 into the exposure correcting data (1, 1, N, N) in the order of D, C, M, Y (step 210). The data is sent via the controller 27 to the exposure calculating device 26, where the printing exposure amount is calculated.

The operation of the present embodiment is described now. As illustrated in FIG. 1, the developed negative film 18 is set in the film carrier 17 in the printer/processor, where an imaging frame to be printed is fed and set in an exposure station. The imaging frame as set is illuminated by the light source 10, and measured by the scanner 23. An operator observes the imaging frame. If he estimates that the imaging frame is beyond a range in which the scanner 23 and exposure calculating device 26 corrects the exposure, (see step 100 in FIG. 9) he operates the keyboard 28 as a first inputting device and manually inputs the exposure correcting data according to his experiences and observation (step 110). The exposure calculating device 26 retrieves the characteristics from the characteristic calculating device 25 and the inputted exposure correcting data, responsively calculates three-color exposure correcting amounts, as a second calculating section (step 120) and sends their signals to the controller 27. The controller 27 adjusts the filter positions according to the three-color exposure correcting data, and adjusts the light quality of the light source 10. Then a print key in the keyboard 28 is operated, to open the shutter 30a for a predetermined period. The imaging frame on the negative film 18 is printed in the exposure on the color paper 37. The color paper 37 after the exposure is transported as far as one frame.

In the movement of the paper frame by frame, the exposure correcting data is converted into a key code (step 130) and the key code is imprinted by the imprinting head 38 on the rear of the color paper 37 (step 140). Then the film 18 is moved through a distance corresponding to as far as one imaging frame. A new imaging frame is printed on the color paper 37. Similar operation follows. The remaining imaging frames are printed on the color paper 37. The color paper 37 as exposed and provided with the imprinted key codes is moved into the paper processor 41, developed therein, cut off frame from frame, and exited to the receptacle tray 44 as finished photoprints 42.

In a paper inspecting step, the finished condition of the photoprints is inspected. If a photoprint is unacceptably finished, the negative film 18 is subjected to a step of reprinting, where the frame to be reprinted is set on the film carrier 17. The mode selector 33 is set to designate the reprinting mode. While this mode is present, the exposure correcting data is numerically displayed on the CRT 29 in response to the input of a key code. For example, if the values inputted through keys have been "3 N 2 N" in the initial printing for the D, C, M and Y, then the rear of the photoprint 42 have been provided with the key code "68". The operator, finding the key code "68" on the photoprint, inputs the "68" manually (step 200 shown in FIG. 10. Then the key code is converted into color correcting data and density data (step 210) and there appears the associated data combination "3 N 2 N" on the CRT 29 (step 215). This causes the operator visually to recognize the data combination having been determined in the initial printing. He is enabled to estimate relative data for further correction to be entered for the imaging frame related to the unacceptable photoprint 9 step 220).

The exposure calculating device 26 adds up the exposure correcting data used in the initial printing and the newly inputted relative data. Their sum is added to the fundamental exposure amount, to obtain the printing exposure amount (step 220) or second exposure correcting amount (step 230). The imaging frame is reprinted in accordance with the printing exposure amount. Note that it is possible, in the paper inspecting step, to imprint the relative data on an unacceptable photoprint. This relative data can be inputted manually through the keyboard.

In an extra printing step, the imaging frame to be printed is set in the exposure station. The key code 43 behind the photoprint 42 is inputted (step 200). The key code 43 is converted by LUT 40b of the key code converter 40 into the corresponding exposure correcting data, (step 240–250) and sent into the exposure calculating device 26, where the exposure amounts are obtained in accordance with the exposure correcting data the same as the initial printing. This causes a photoprint having the same density and color balance as the initial printing.

Figure 3:
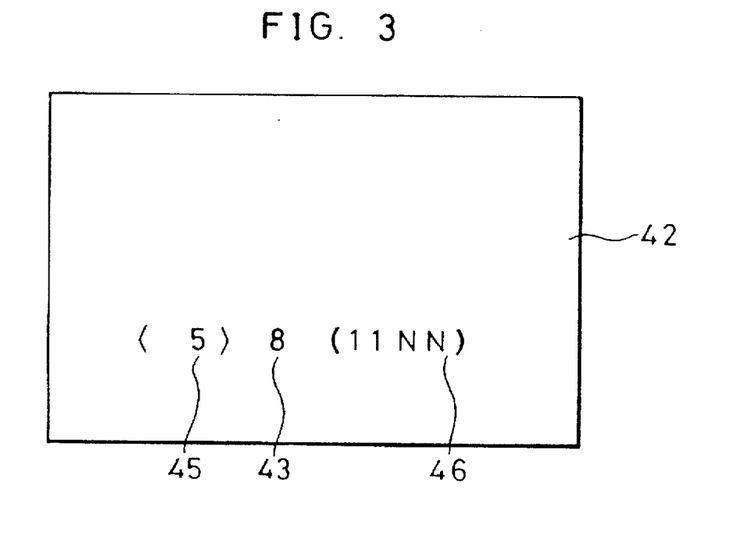
FIG. 3 is a rear view illustrating another photoprint with the key code imprinted.

In the above, only the key code 43 is imprinted behind the photoprint 42. In addition, the film carrier can be provided with a bar code reader 17a (See FIG. 1) for reading a frame number bar code. The bar code, recorded in association with the imaging frame to be printed, can be detected automatically by the bar code reader 17a. As illustrated in FIG. 3, it is possible to imprint a frame number 45 on the photoprint 42 in addition to the key code 43. An exposure correcting data 46 may be added to the key code 43 behind the photoprint 42. This is favorable in another photographic printer without use of the key code. The exposure correcting data set in the initial printing can be inputted.

In the above embodiment, all the combinations are graded in fashion of mechanically listing the permutations in the order of the values N, 1, A, 2, B, 3 and C, for the correcting data arranged as D, C, M and Y. The above graded set of the combinations is likely to fail to reflect the actual frequency of occurrence of the combinations. For example, it is possible that the data combination "N 1 N N" is more frequent than the data combination "C N N N". The former is graded as key code "7", and should have been expected as less frequent than the latter graded as key code "6".

In view of this, an improved relationship determined key codes and the correcting data in artificially fashion is illustrated in Table 4.

TABLE 4

| Key codes | Correcting data D C M Y | Quality |
|---|---|---|
| 0 | N N N N | Normal |
| 1 | 1 N N N | Weak positive density failure |
| 2 | 2 N N N | Weak positive density failure |
| 3 | A N N N | Weak negative density failure |
| 4 | 3 N N N | Strong positive density failure |
| 5 | B N N N | Strong negative density failure |
| 6 | N N 2 N | W/ fluorescent lamp |
| 7 | A N 2 N | Under-exposed w/ fluorescent lamp |
| 8 | 4 N N N | Very strong positive density failure |
| 9 | 1 2 N 2 | Greenish color failure |
| 10 | A 2 N 2 | Greenish color failure |
| 11 | N 1 N 2 | Greenish color failure |
| 12 | N 2 N 2 | Greenish color failure |
| 13 | A 1 N 2 | Greenish color failure |
| : | : : : : | |
| 42 | 2 1 N 2 | Greenish color failure & weak positive density failure |
| 43 | 4 2 N 2 | Greenish color failure & strong positive density faiiure |
| 44 | 2 N N 2 | Yellowish color failure & weak positive density failure |
| : | : : : : | |
| 891 | 3 D 2 B | Least frequent |
| 892 | 4 2 D 2 | Least frequent |
| 893 | C C 4 3 | Least frequent |
| 894 | D 1 4 4 | Least frequent |
| : | : : : : | |

TABLE 5

| Novel inputs thru keyboard Key codes | Conventional inputs thru keyboard Correcting data D C M Y |
|---|---|
| 3 | A N N N |
| 0 | N N N N |
| 4 | 3 N N N |
| 5 | B N N N |
| 12 | N 2 N 2 |
| 0 | N N N N |
| 6 | N N 2 N |
| 44 | 2 N N 2 |
| 2 | 2 N N N |
| 9 | 1 2 N 2 |
| 892 | 4 2 D 2 |
| 0 | N N N N |
| 2 | 2 N N N |

Figure 4:
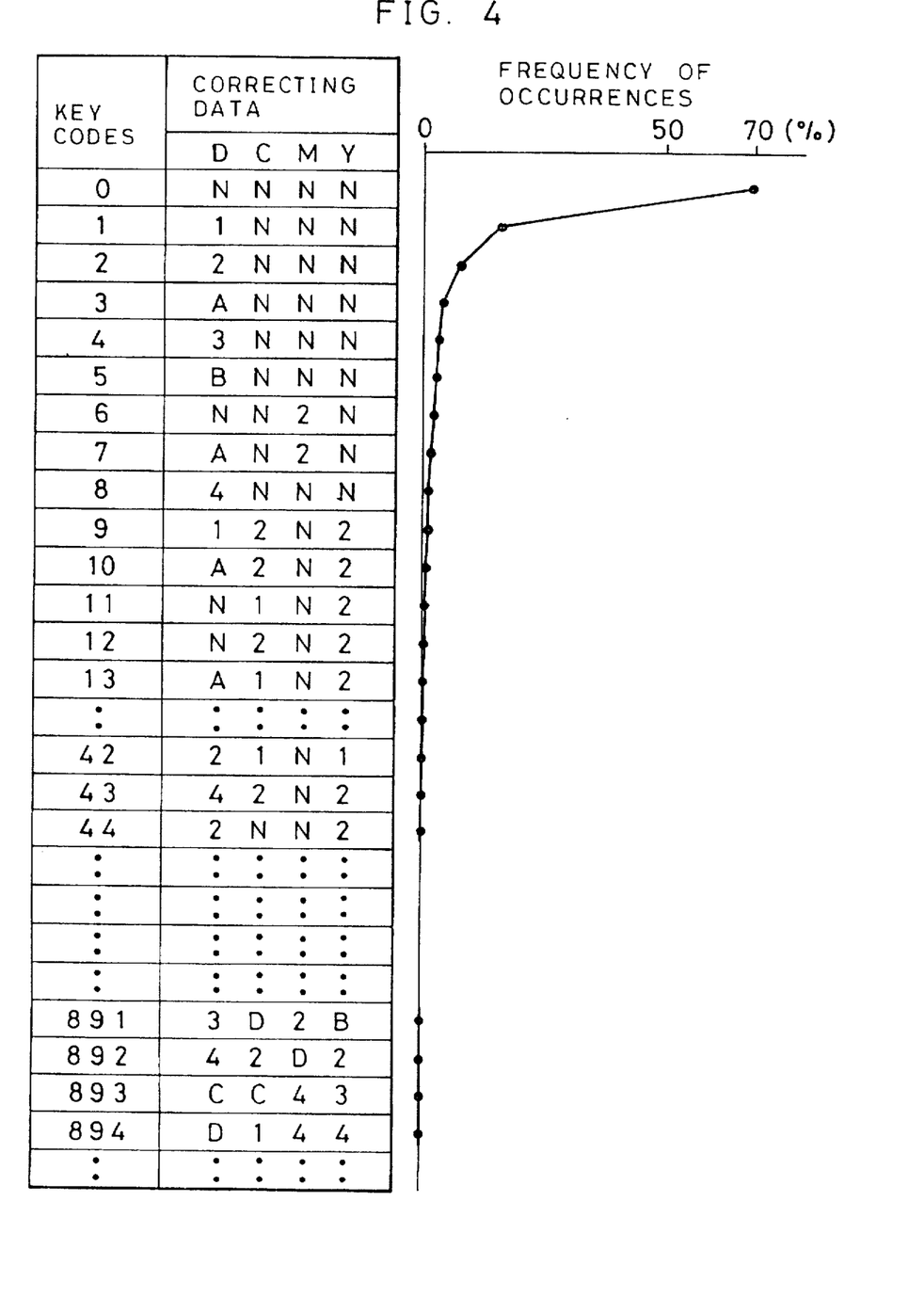
FIG. 4 is a graph illustrating frequency of occurrence of each combination of printing information, in association with the key codes.

Table 4 illustrates associated key codes in the case where steps to be inputted are 9 values of −4 to −1, N, and +1 to +4. FIG. 4 is a graph illustrating frequency of occurrence of each combination of exposure correcting data in the form indicated by percents, in association with the key codes. Table 5 illustrates an example where plural combinations of exposure correcting data are converted into actually used key codes. In the conventional inputting manner, four times of operating the keyboard are required for entering the correcting data. However, the novel inputting manner only requires one, two, or three times of operating the keyboard in correspondence with the number of the digits of the key codes. Only key codes having small frequency of occurrence requires two or three times of operating the keyboard. This results in simplification such that some key codes having greatest frequency of occurrence requires only one time of operating the keyboard. In the conventional inputs, unskilled operators in the photo laboratory may have difficulty because four combined values arranged in a fixed order must be entered exactly. However, unskilled operators can easily enter correcting data in the form of key codes.

Although Table 4 illustrates the typical set of grades of the combinations of the correcting data, true grades of the combinations of the correcting data are changed with seasons, regions, ages, and other environmental factors. To determine key codes, it is therefore preferable to assign key codes to the combinations by means of a statistical process, in which frequency of occurrences of the data combinations can be checked in a limited range of a season, a region, or the like. It is possible to predetermine plural sets of key codes associated with the data combinations. The plural sets of the key codes can be standardized in common to plural photo laboratories. This enables a photo laboratory, even different from one having initially printed, to finish extra prints from the negative film in the condition as good as the initial printing.

In the above, the decimal system is used for converting the correcting data to the key codes. Alternatively the hexadecimal system may be used, as illustrated in Table 3. The number of the digits of each key code, as compared with the decimal system, is reduced by the use of the system hexadecimal. The number of keys are as many as 16, so that the frequently of operating the keyboard is reduced. Therefore the exposure correcting data can be entered with greater efficiency.

Figure 5:
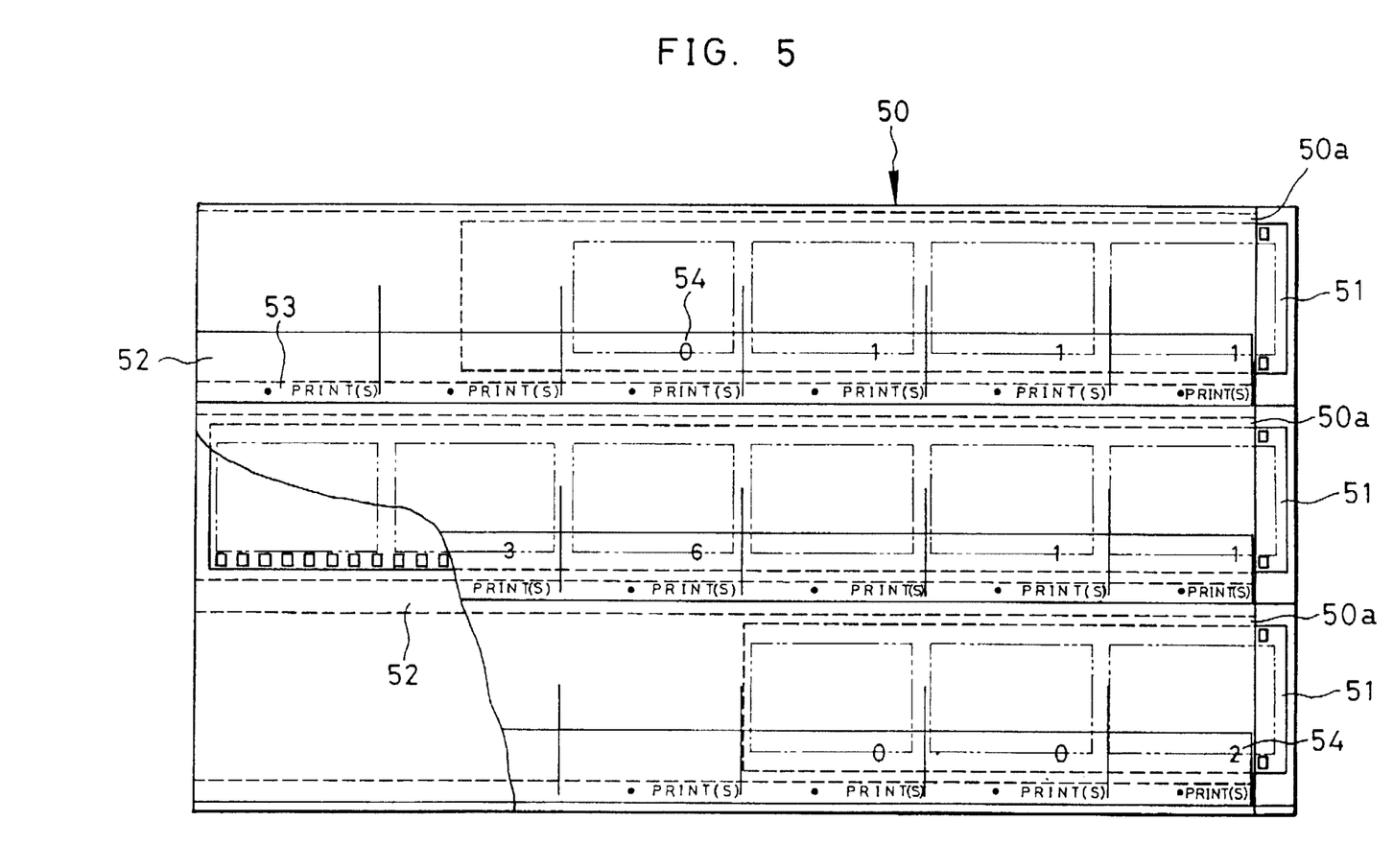
FIG. 5 is a plan view illustrating containing sheaths.
Figure 5A:
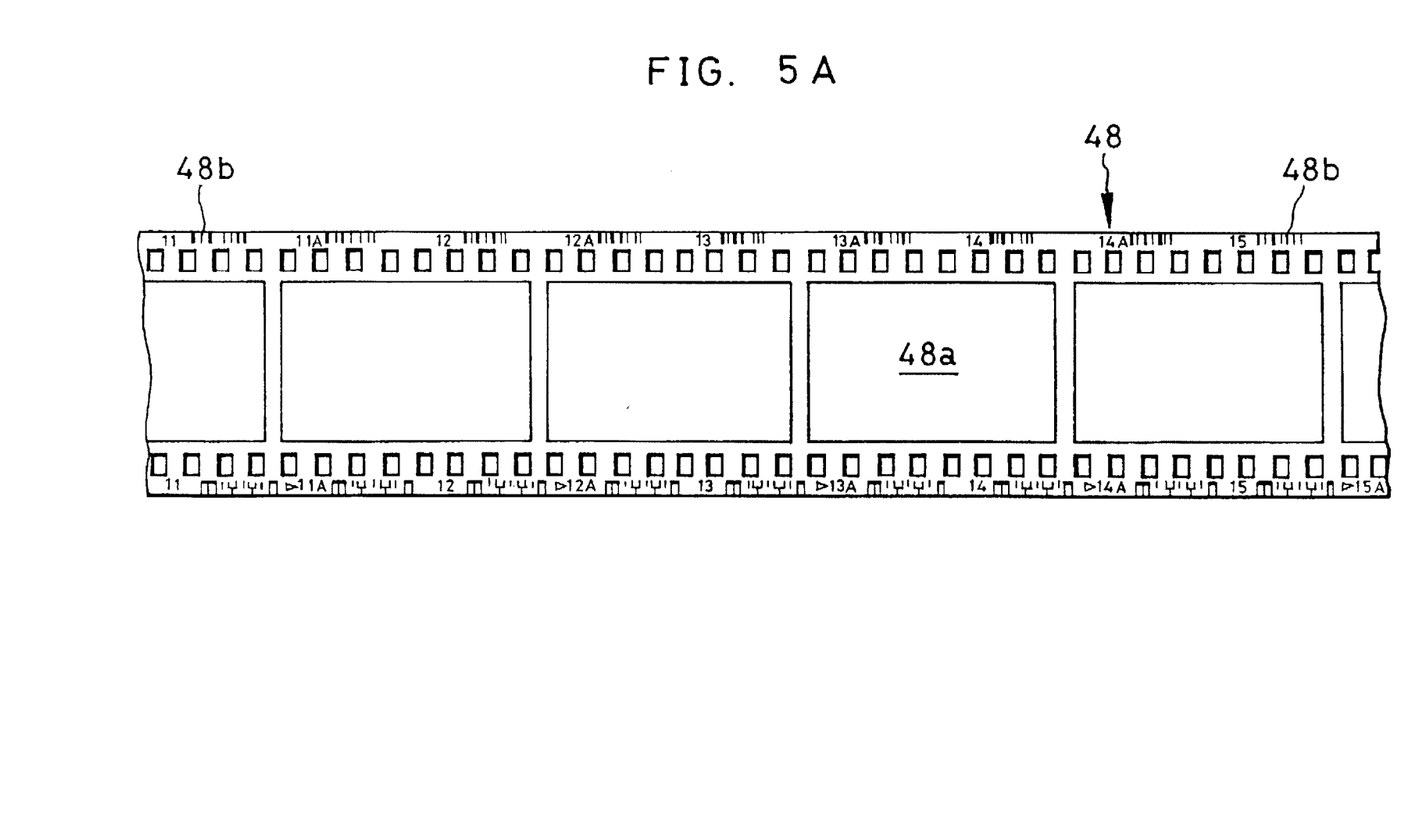
FIG. 5A is a plan view illustrating photo film other than one contained in the sheaths of FIG. 5.

Another preferred embodiment is now described, in which a key code 54 is imprinted on a film containing sheath 50a instead of the rear of the photoprint. FIG. 5 illustrates a sheath web 50, which has plural containing sheaths 50a, each of which contains a film piece 51 cut to have 6 imaging frames. Between two adjacent containing sheaths 50a, there is formed a blank belt portion 52 which is previously printed as blank or in white color. The blank belt portion 52 has a space 53 defined before the word PRINT(S) and marked by the dot, for filling the number of prints to be ordered for the extra printing. In the present embodiment, the key code 54 the same as the former embodiment is imprinted near to the number-filling space 53.

Figure 6:
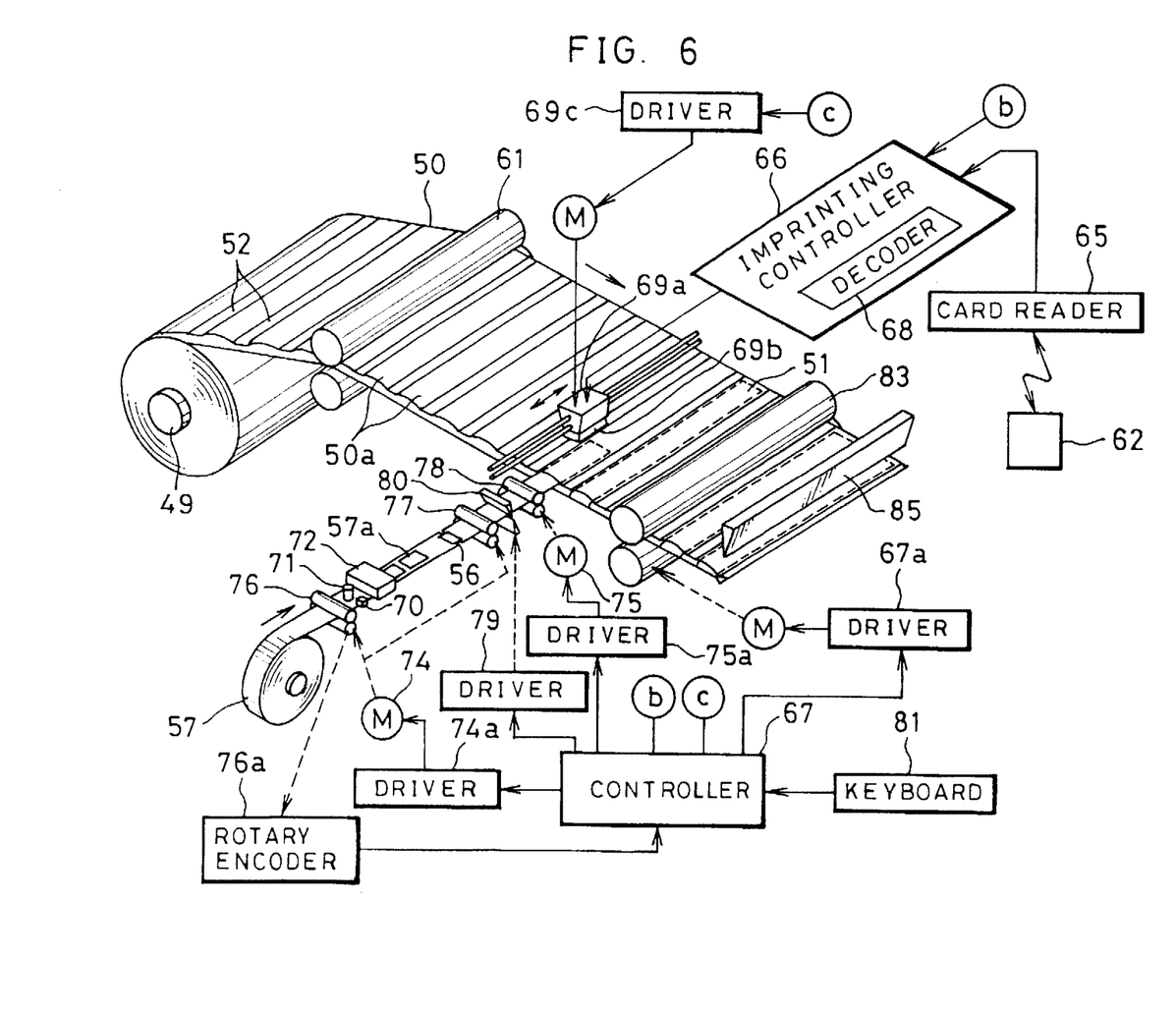
FIG. 6 is a schematic diagram illustrating a film cutting inserter incorporating a printing information recording apparatus.

In a large photo laboratory, 50 to 100 strips of negative film are spliced together with splice tape 56 to be an elongated film 57 as illustrated in FIG. 6 for the purpose of high efficiency. The elongated film 57 is developed by a film processor (not shown), and then set into a film analyzer (not shown), at which an operator observes each imaging frame. If he estimates that the imaging frame would not be finished well by exposure at the fundamental exposure amount obtained from the large-area transmittance density (LATD), then he depresses a density key, color correcting keys, a function key, correcting keys, and step keys to enter the exposure correcting data. Exposure correcting data inputted for each imaging frame are written to an LSI card. The elongated film 57 is passed through a notcher section, which is operated to form a semi-circular notch for each frame to be printed. Note that various kinds of information may be written not only by the film analyzer but by the printer to the LSI card. Instead of the LSI card, it is possible to use a floppy disk or a punched tape.

After the inspection of the negative film 57, the LSI card and the negative film are set into the automatic printer. The imaging frames to be printed are printed one after another in accordance with the printing exposure information stored in the LSI card. The color paper after printing is processed by the paper processor, subjected to the paper inspecting step, and cut frame from frame to be photoprints. The elongated negative film after the printing is subjected to a step of cutting.

Figure 7:
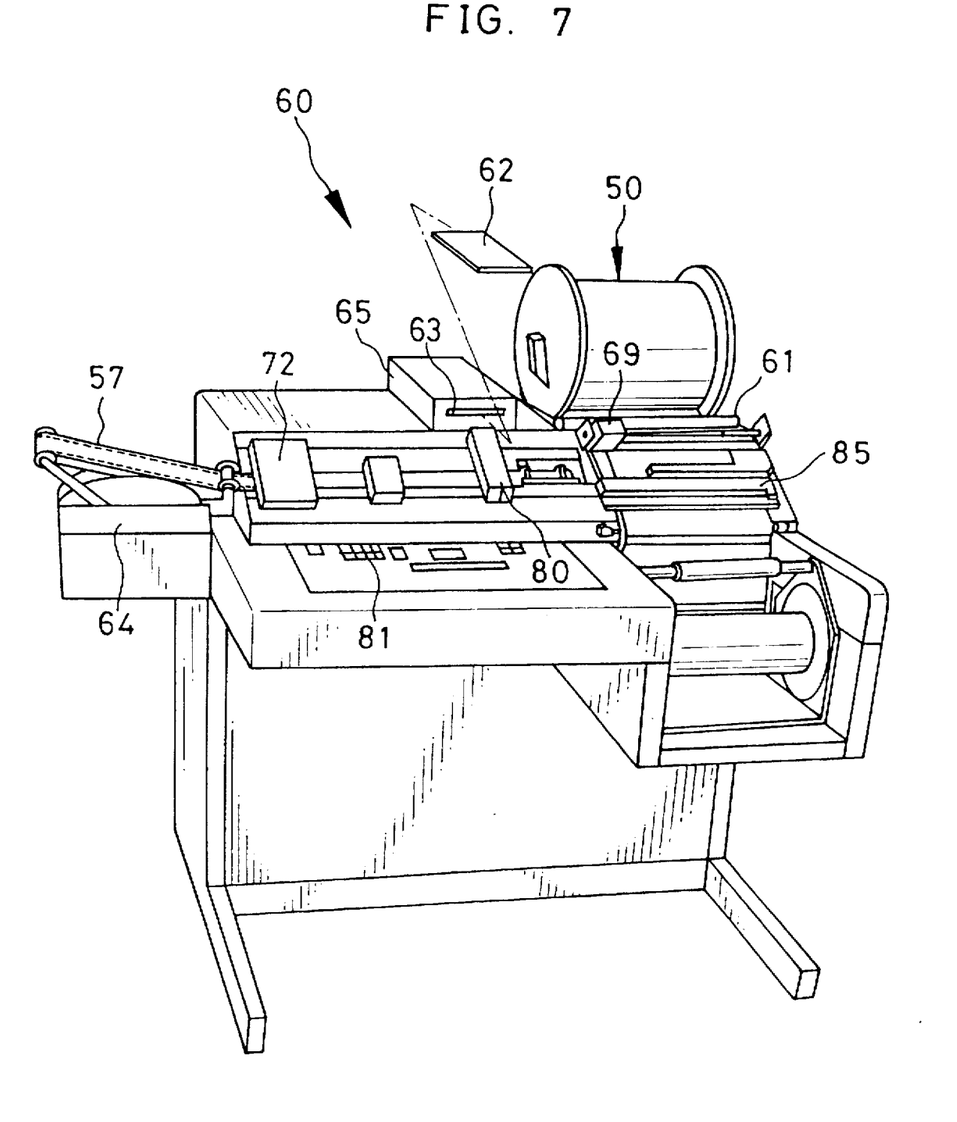
FIG. 7 is a perspective view illustrating the film cutting inserter.

In the film cutting step, a film cutting inserter 60 as illustrated in FIG. 7 is used. The elongated film 57 is cut into film pieces 51 which have respectively six imaging frames, and are inserted in the sheath web 50. In the blank belt portion 52, the key code 54 is imprinted frame by frame in accordance with the exposure correcting data. The sheath web 50 is wound on the winding shaft 49, and set in a holder in the cutting inserter. The sheath web 50 is nipped and drawn out by drawing rollers 61, and conveyed intermittently to the inserting station. In FIG. 7, an LSI card 62 used in the printing is set in a card slot 63 in the cutting inserter. The elongated film 57 is set in a film supply section 64. In FIG. 6, the exposure correcting data stored in the LSI card 62 for each imaging frame is read by a card reader 65, and applied to an imprinting controller 66 or a head drive device.

The imprinting controller 66 is provided by an inserter controller 67 with data of a length of the film piece 51, data of a frame position, and the exposure correcting data associated with the frame position. The imprinting controller 66 has a decoder 68, which receives the density correcting data, and the cyan, magenta and yellow correcting data, and generates a signal of the key code representing the combination of the four bodies of correcting data.

The decoder 68 consists of a look-up table memory, to which the key codes, assigned to respective combinations of the correcting data, are written, as illustrated in Table 1.

The imprinting controller 66 controls an imprinting head 69b, and imprints the key code 54 (See FIG. 5), into which the exposure correcting data for the initial printing has been converted, in a position associated with each imaging frame on the sheath web 50. The imprinting of the key code 54 is before the insertion of the film piece 51 into the sheath web 50.

As illustrated in FIG. 6, the elongated film 57 is drawn out by the drawing rollers 61, and conveyed to pass a notch sensor 70, a splice tape sensor 71, and a frame position detector 72. The notch sensor 70 detects the notches in the elongated film 57. The splice tape sensor 71 detects the splice tape 56 on the elongated film 57. The frame position detector 72 detects each imaging frame 57a. Signals representing the notch, the splice tape, and the imaging frame are sent into the controller 67.

The controller 67 drives motors 74 and 75 via drivers 74a and 75a, controls pairs of rollers 76, 77 and 78, and controls cutter blades 80 via a cutter driver 79. To the controller 67, a keyboard 81 is connected. The keyboard 81 is operated to select each mode and manual determination of conditions.

The controller 67 counts the notch signal from the notch sensor 70. During the movement of the film 57, six frames 57a are counted. In response to this, the controller 67 drives the cutter blades 80 to cut the film piece 51 away from the film 57. A rotary encoder 76a, in addition, monitors rotations of the drawing roller 76. The controller 67 responsively measures a rotational amount of the drawing roller 76, and hence a moving amount of the film 57. In response to increase the film moving amount up to the length of six imaging frames, the cutter blades 80 is driven to cut the film piece 51 away between adjacent frames, even before detection of 6 notches. The controller 67, when supplied with splice tape signal, drives the cutter blades 80 to cut off the splice tape 56 and marginally spliced film portions, even before measurement of 6 frames' length and before detection of 6 notches. The film piece 51 as cut off in any manner is inserted into the containing sheath 50a completely by the inserting roller 78 and the associated motor 75. Subsequently the sheath web 50 is conveyed by feeding rollers 83 only as far as one sheath, to set the next unused containing sheath 50a in the inserting station. Next film piece is inserted.

A single strip of the negative film, derived from one film cassette, has a form of a set of plural film pieces 51. When the set of the plural film pieces 51 are inserted in the sheath web 50, then the feeding rollers 83 move a set of plural containing sheaths 50a out of the inserting station. The set of the containing sheaths 50a are perforated by a perforator 85 between each adjacent two of the containing sheaths 50a. Subsequently the set of the containing sheaths 50a is cut away from the sheath web 50, to obtain unify the set of the plural film pieces 51.

Figure 8:
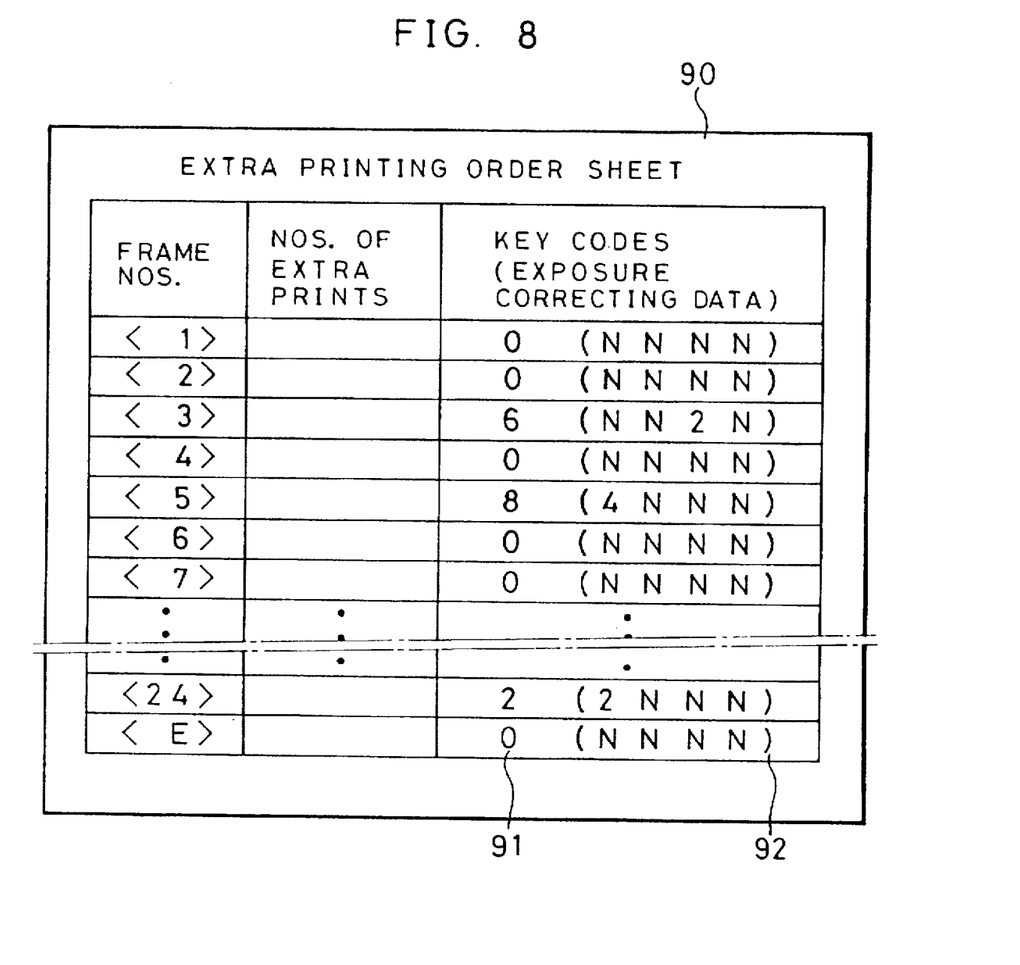
FIG. 8 is a plan view illustrating an order sheet for extra printing on which the key code s are imprinted.

In the embodiment above, the key codes 54 are imprinted on the sheath web 50 in the frame position. Furthermore, it is possible to imprint a key code 91 on an extra printing order sheet 90, instead of imprinting exposure correcting data 92. Of course add the exposure correcting data 92 can be added to the key code 91. This is favorable in use with a conventional photographic printer without use of the key code. The exposure correcting data set in the initial printing can be inputted easily. Note that the extra printing order sheet 90 is provided previously with a format having blanks for the key codes 91 in a table. Alternatively, it is possible to imprint the key codes 91 completely together with blanks for frame numbers, and the number of extra prints, and other various information.

In the above embodiments, the combinations of density correcting data and yellow, magenta and cyan correcting data are arranged with somewhat high fidelity in the order of the frequency of occurrences thereof, and associated with the key codes as serial numbers. However, it is alternatively possible to use a key-code converting table in which the data combinations are roughly arranged in association with key codes as serial numbers. To prepare such a table, following steps may be used: The 10 most frequently occurred combinations may be selected from all the possible combinations, and respectively associated with key codes from "0" to "9" having only one digit. Then, the next most frequent 90 combinations may be selected from all the remaining combinations, and respectively associated with key codes from "10" to "99" having only two digits. Subsequently the next most frequent 900 combinations may be selected from all the remaining combinations, and respectively associated with key codes from "100" to "999" having three digits. Finally the least frequent combinations may remain, and be respectively associated with key codes from "1000" to "2400" having four digits. Even with this rough arrangement of the data combinations, the effects the same as the above embodiment can be achieved.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic printer for producing a first photoprint from an image frame on photo film, comprising:
   a first calculating section for determining fundamental exposure amounts for three primary colors by effecting photometry of said image frame;
   a first inputting device for inputting color correcting data for said three primary colors and density correcting data respectively to correct said fundamental exposure amounts;
   a second calculating section for determining printing exposure amounts for said three primary colors in accordance with said three-color fundamental exposure amounts, said three-color color correcting data, and said density correcting data, wherein said three-color printing exposure amounts are used for exposure control in producing said photoprint;
   a table memory for converting exposure correcting information into a key code, wherein said exposure correcting information is a combination of said three-color color correcting data and said density correcting data, said key code representing information to be inputted manually in producing a second photoprint from said image frame; and
   an imprinting device for imprinting said key code on a recording medium.

2. A recording apparatus as defined in claim 1, wherein said recording medium is a containing sheath for containing said photo film, and said key code is imprinted where said imaging frame is contained in said containing sheath.

3. A recording apparatus as defined in claim 1, wherein said imprinting device includes:
   an imprinting head for accessing said photoprint, a rear of said photoprint comprising said recording medium; and
   a head drive circuit, supplied with a signal of said key code by said table memory, for driving said imprinting head, to imprint said key code associated with said imaging frame to said photoprint.

4. A recording apparatus as defined in claim 3, wherein said inputting device is further adapted to manually inputting said key code read visually from said photoprint for said further printing;
   further comprising second table memory storing a second table representing said relationship between said key code and said plural combinations of said density correcting data and said color correcting data, one of said combinations read from said second table memory by said key code being an address of said second table memory, to correct said fundamental exposure amount in said further printing.

5. A recording apparatus as defined in claim 4, further comprising a display device for displaying said one combination read from said second table memory, said displayed exposure correcting information referred to in combination with observation of a condition of previously finishing said photoprint, and adapted to manually inputting new density correcting data and/or color correcting data through said inputting device.

6. A recording apparatus as defined in claim 1, wherein said photo film has number information recorded thereon in association with said imaging frame;
   further comprising a number reader for reading said number information of said imaging frame from said photo film; and
   wherein said imprinting device further imprints said number information to said recording medium in a position of said imaging frame.

7. A recording apparatus as defined in claim 6, wherein said recording medium comprises an order sheet in use for extra printing from said imaging frame, and a number of extra prints to be produced from said imaging frame is recordable on said order sheet in association with said number information.

8. A recording apparatus as defined in claim 6, said recording apparatus disposed in a film inserter including:

a sheath supply device for supplying sheath web having at least one containing sheath, said containing sheath being open toward a longitudinal edge of said sheath web, and comprising said recording medium;

an inserting station, disposed downstream of said sheath supply device, and adapted to passage of said sheath web supplied and insertion of said photo film;

an intermittent moving device, disposed downstream of said inserting station, for moving said sheath web intermittently sheath by sheath; and a cutter device for cutting a film piece off from said photo film as moved;

an inserting device, disposed between said cutter device and said inserting station, for advancing said cut film piece toward said inserting station; and a control device for driving said intermittent moving device to set said containing sheath of said sheath web in said inserting station, and for driving said inserting device to insert said film piece into said containing sheath.

9. A recording apparatus as defined in claim 8, further comprising a data reader, provided with an input medium for storing said exposure correcting information, for reading from said input medium said exposure correcting information of each said imaging frame, said exposure correcting information associated with a frame position of said imaging frame on said photo film, said read exposure correcting information converted into said key code by said table memory;

said imprinting device including:

an imprinting head for accessing said containing sheath;

a sliding mechanism for sliding said imprinting head on said sheath web in a longitudinal direction of said containing sheath;

slide driver, supplied with data of said frame position of each said film piece by said control device, for driving said sliding mechanism, to slide said imprinting head to said frame position on said containing sheath, said frame position designated for location of said imaging frame in containing said film piece in said containing sheath; and a head drive circuit supplied with a signal of said key code by said table memory, for driving said imprinting head stopped in said frame position, to imprint said key code associated with said imaging frame to said containing sheath.

10. A recording apparatus as defined in claim 9, wherein said input medium is an IC card.

11. A recording apparatus as defined in claim 9, further comprising:

a film supply device for supplying said photo film;

a position detector for detecting a position between a plurality of imaging frames on said photo film supplied from said film supply device, said cutter device cutting said photo film in said position detected; and a movement measuring device for measuring an amount of moving said photo film from said film supply device;

wherein said control device evaluates said moving amount of said photo film, and when said moving amount increases to be a length of N imaging frames as viewed from said cut position, then said cutter device cuts said photo film between imaging frames, and subsequently said control device actuates said inserting device, to insert said film piece into said containing sheath.

12. A recording apparatus as defined in claim 11, wherein said film piece is inserted in said containing sheath after said key code is imprinted to said containing sheath.

13. A recording apparatus as defined in claim 12, wherein said control device supplies length data of said film piece to said head drive circuit, and if said film piece is shorter than said length of N imaging frames, then said head drive circuit further considers said length data in sliding said imprinting head.

14. A recording apparatus as defined in claim 13, further comprising a perforator for perforating said sheath web between said containing sheaths, plural film pieces inserted in one group of said containing sheaths in said sheath web to constitute said film of one original strip, and said one group of said containing sheaths being perforated by said perforator to be cuttable off from other groups of containing sheaths.

15. A recording apparatus as defined in claim 17, wherein said photo film comprises elongated photo film of which plural strips of said photo film are spliced together with splice tape;

further comprising a splice tape sensor for detecting said splice tape of said elongated film supplied; and wherein said control device, in response to a signal from said splice tape sensor, drives said cutter device to cut away portions spliced by said splice tape.

16. A photographic printing method of producing a photoprint from an image frame on photo film, comprising the steps of:

determining fundamental exposure amounts for three primary colors by effecting photometry of said image frame;

inputting color correcting data for said three primary colors and density correcting data respectively to correct said fundamental exposure amounts;

determining exposure correcting amounts for said three primary colors in accordance with said three-color fundamental exposure amounts, said three-color color correcting data, and said density correcting data, wherein said three-color printing exposure amounts are used for exposure control in producing said first photoprint;

converting exposure correcting amounts into a key code, wherein said exposure correcting amounts are combinations of said three-color color correcting data and said density correcting data, said key code representing information to be inputted manually in producing a second photoprint from said image frame; and imprinting said key code on a recording medium.

17. A recording method as defined in claim 16, wherein said recording medium is a containing sheath for containing said photo film, and said key code is imprinted where said imaging frame is contained in said containing sheath.

18. A recording method as defined in claim 16, further comprising steps of:

visually reading said key code from said recording medium, to input said key code manually for said further printing;

reading one of said combinations with said key code being an address; and correcting said fundamental exposure amount in said further printing.

19. A recording method as defined in claim 18, further comprising steps of:

displaying said one read combination;

observing a condition of previously finishing said photoprint;

manually inputting new density correcting data and/or color correcting data, in accordance with said displayed exposure correcting information referred to in combination with said previously finishing condition as observed.

20. A recording method as defined in claim 16, wherein: said photo film has number information recorded thereon in association with said imaging frame; said number information of said imaging frame is read from said photo film; and said number information is imprinted to said recording medium in a position of said imaging frame.

21. A recording method as defined in claim 20, wherein said recording medium comprises an order sheet in use for extra printing from said imaging frame, and a number of extra prints to be produced from said imaging frame is recordable on said order sheet in association with said number information.

22. A recording method as defined in claim 20, further comprising steps of:

passing sheath web through an inserting station;

moving said sheath web intermittently, to set a containing sheath of said sheath web in said inserting station, said containing sheath being open toward a longitudinal edge of said sheath web, and comprising said recording medium;

cutting a film piece off from said photo film as moved; and advancing said cut film piece toward said inserting station, to insert said film piece into said containing sheath.

23. A recording method as defined in claim 22, further comprising steps of:

reading from an input medium said exposure correcting information of each said imaging frame stored in said input medium, said exposure correcting information associated with a frame position adapted to said imprinting, said read exposure correcting information converted into said key code;

retrieving data representing each said film piece and data representing said frame position;

sliding said imprinting head on said sheath web in a longitudinal direction of said containing sheath;

stopping said imprinting head in each said frame position on said containing sheath, said frame position designated for location of said imaging frame in containing said film piece in said containing sheath; and imprinting said key code associated with said imaging frame to said containing sheath, by driving said imprinting head stopped in said frame position.

24. A recording method as defined in claim 23, further comprising steps of:

detecting a position between a plurality of imaging frames on said photo film supplied;

cutting said photo film in said position detected;

measuring an amount of moving said photo film;

evaluating said moving amount of said photo film; and when said moving amount increases to be a length of N imaging frames as viewed from said cut position, then cutting said photo film between imaging frames, subsequently to insert said film piece into said containing sheath.

25. A recording method as defined in claim 24, wherein said film piece is inserted in said containing sheath after said key code is imprinted to said containing sheath.

26. A photographic printer for producing a first photoprint from an image frame on photo film, comprising:

a first calculating section for determining fundamental exposure amounts for three primary colors by effecting photometry of said imaging frame;

a first inputting device for inputting color correcting data for said three primary colors and density correcting data respectively to correct said fundamental exposure amounts;

a second calculating section for determining printing exposure amounts for said three primary colors in accordance with said three-color fundamental exposure amounts, said three-color color correcting data, and said density correcting data, wherein said three-color printing exposure amounts are used for exposure control in producing said photoprint;

a table memory for converting exposure correcting information into a key code, wherein said exposure correcting information is a combination of said three-color color correcting data and said density correcting data, said key code representing information to be inputted manually in producing a second photoprint from said image frame; and an imprinting device for imprinting said key code on a rear of said first photoprint.

27. A photographic printer as defined in claim 26, wherein each of said key codes is a selected number such that a number selected for one of said key codes corresponding to exposure correcting information having a high frequency of occurrence is smaller than a number selected for another one of said key codes having a low frequency of occurrence.

28. A photographic printer as defined in claim 27, wherein said imprinting device includes:

an imprinting head for accessing said first photoprint; and a head drive circuit, supplied with a signal of said key code by said table memory, for driving said imprinting head to imprint said key code associated with said imaging frame on said first photoprint.

29. A photographic printer as defined in claim 28, further comprising:

a second inputting device for inputting said key code imprinted on said rear of said first photoprint in which said key code input via said second inputting device is used in producing said second photoprint from said image frame; and a second table memory for converting said key code input by said second inputting device into said three-color color correcting data and said density correcting data, wherein said three-color color correcting data and said density correcting data from said second table memory is input to said second calculating section for exposure control in producing said second photoprint.

30. A photographic printer as defined in claim 29, further comprising a display device for displaying said three-color color correcting data and said density correcting data from said second table memory.

31. A photographic printing method of producing a photoprint from an image frame on photo film, comprising the steps of:

determining fundamental exposure amounts for three primary colors by effecting photometry of said image frame;

inputting color correcting data for said three primary colors and density correcting data respectively to correct said fundamental exposure amounts;

determining exposure correcting amounts for said three primary colors in accordance with said three-color fundamental exposure amounts, said three-color color correcting data, and said density correcting data, wherein said three-color printing exposure amounts are used for exposure control in producing said first photoprint;

converting exposure correcting amounts into a key code, wherein said exposure correcting amounts are combinations of said three-color color correcting data and said density correcting data, said key code representing information to be inputted manually in producing a second photoprint from said image frame; and imprinting said key code on a rear of said first photoprint.

32. A photographic printing method as defined in claim 31, wherein each of said key codes is a selected number such that a number selected for one of said key codes corresponding to exposure correcting amounts having a high frequency of occurrence is smaller than a number selected for another one of said key codes having a low frequency of occurrence.

33. A photographic printing method as defined in claim 32, further comprising steps of:

inputting said key code imprinted on said rear of said first photoprint in which the inputted key code is used in producing said second photoprint from said image frame;

converting said inputted key code into said three-color color correcting data and said density correcting data;

inputting additional color correcting data for said three primary colors and additional density correcting data for use in printing said second photoprint;

determining second exposure correcting amounts for said three primary colors in accordance with said three-color fundamental exposure amounts, said three-color color correcting data, said density correcting data, said three-color additional color correcting data, and said additional density correcting data, wherein said three-color second exposure correcting amounts are used for exposure control in producing said second photoprint;

converting said second exposure correcting amounts into a second key code, wherein said second exposure correcting amounts are combinations of three-color second color correcting data and second density correcting data, wherein said three-color second color correcting data is a sum of said three-color color correcting data and said three-color additional color correcting data, and wherein said second density correcting data is a sum of said density correcting data and said additional density correcting data, and said second key code representing information to be input manually in producing a third photoprint from said image frame; and imprinting said second key code on a rear of said second photoprint.

34. A photographic printing method as defined in claim 33, further comprising a step of displaying on a display device said three-color color correcting data and said density correcting data converted from the input key code in producing said second photoprint for checking correction of exposure in producing said second photoprint.

* * * * *